of patent: Nov. 28, 2017

(12) United States Patent
Porter

(10) Patent No.: US 9,832,843 B1
(45) Date of Patent: Nov. 28, 2017

(54) KIT FOR ILLUMINATING A ROOM

(71) Applicant: Ethan Spencer Porter, Port Ludlow, WA (US)

(72) Inventor: Ethan Spencer Porter, Port Ludlow, WA (US)

( * ) Notice: Subject to any disclaimer, the term of this patent is extended or adjusted under 35 U.S.C. 154(b) by 0 days.

(21) Appl. No.: 15/419,704

(22) Filed: Jan. 30, 2017

Related U.S. Application Data

(60) Provisional application No. 62/388,407, filed on Jan. 29, 2016.

(51) Int. Cl.
*H05B 37/02* (2006.01)
*E06B 7/28* (2006.01)
*F21V 33/00* (2006.01)
*F21V 23/04* (2006.01)

(52) U.S. Cl.
CPC .......... *H05B 37/0227* (2013.01); *E06B 7/28* (2013.01); *F21V 23/0471* (2013.01); *F21V 33/006* (2013.01)

(58) Field of Classification Search
CPC ... H05B 37/0227; E06B 7/28; F21V 23/0471; F21V 33/006
USPC ......................................................... 315/84
See application file for complete search history.

(56) References Cited

U.S. PATENT DOCUMENTS

| 3,797,171 | A |   | 3/1974  | Farmer |
|-----------|---|---|---------|--------|
| 5,969,637 | A | * | 10/1999 | Doppelt ............. G07C 9/00817 318/266 |
| 6,076,947 | A | * | 6/2000  | Miller .................... B60J 3/0282 338/183 |
| 6,084,358 | A | * | 7/2000  | Dolson .............. H05B 37/0209 315/226 |
| 6,736,534 | B1|   | 5/2004  | Fite |
| 7,972,027 | B1| * | 7/2011  | Hatfield .................... F21S 2/00 362/217.02 |
| 2005/0029080 | A1 |   | 2/2005 | Rupp |
| 2015/0285489 | A1 |   | 10/2015 | Ulysse |

* cited by examiner

*Primary Examiner* — Don Le
(74) *Attorney, Agent, or Firm* — Plager Schack LLP

(57) ABSTRACT

A kit for illuminating a room includes a two-part contact switch mounted on a top edge of an interior surface of the door and a door rail contact mounted on a door track railing where the corresponding top edge rests when the door is completely opened. The door contact switch and the door rail contact switch are electrically connected to the light strip and a power source via a power adapter, respectively. When the door is completely opened, a contact plate of the door rail contact switch receives a plurality of spring-loaded contacts protruding from the door contact switch that completes a circuit, powers the light strip, in turn, illuminating the room.

4 Claims, 4 Drawing Sheets

KIT FOR ILLUMINATING A ROOM

RELATED APPLICATION

This application claims priority to provisional patent application U.S. Ser. No. 62/388,407 filed on Jan. 29, 2016, the entire contents of which is herein incorporated by reference.

BACKGROUND

As used in this application, a "room" is an enclosed space that can be accessed through a portal on an edge of the room. As used in this application, the portal is called a "door" though any opening which can fit a human user meets this definition. In the case of a garage, the garage is the room and the garage door is one door, though there can be other doors as well. This garage door can be called an "overhead door" when it is opened in that manner.

As used in this application a "power adapter" can be one of the set consisting of: a voltage reduction device, a power invertor, and a combination of a voltage reduction device with a power inverter.

The embodiments herein relate generally to a kit for illuminating a room when a door is opened, such as in the case of a residential garage or similar industrial overhead door. The kit comprises a voltage adapter powering one part of a two-part contact switch so that the switch completes the circuit only when the door is opened which powers a lighting strip attached to inside of the door, in turn, illuminating the room. Prior to this invention, the Hatfield Patent (U.S. Pat. No. 7,972,027 B1) and the Dolson Patent (U.S. Pat. No. 6,084,358 A) describes a system for illuminating the garage door. The invention described in prior arts require complicated electrical wiring system that is not only difficult to install but also inefficient. For example, the Hartfield Patent describes an electrical wiring system that is complicated, vulnerable to fail due to flexing of the wire and illuminates the garage door in both open and close positions. In addition, both the prior arts describe using fragile fluorescent lighting along with ballast mounted on the garage door for illuminating the garage door. Thus, none of the prior arts described an efficient, simple and inexpensive system as described in the present invention.

SUMMARY

A kit can be used for illuminating a room when a door is completely opened. The kit includes a two-part contact switch that includes a door contact switch having a plurality of spring-loaded contacts that can be mounted on an edge of an interior surface of the door. A door rail contact switch has a contact plate that faces the door and a manual switch. This is mounted on a door track railing where a corresponding top edge rests when the door is completely opened. A light strip is electrically connected to the door contact switch and horizontally mounted on the interior surface of the door. A voltage reduction device is electrically connected to the door rail contact switch on one end and to a power source on other end. When the door is completely opened, the contact plate of the door rail contact switch receives the spring-loaded contacts protruding from the of the door contact switch that completes a circuit, powers the light strip, and illuminates the room.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
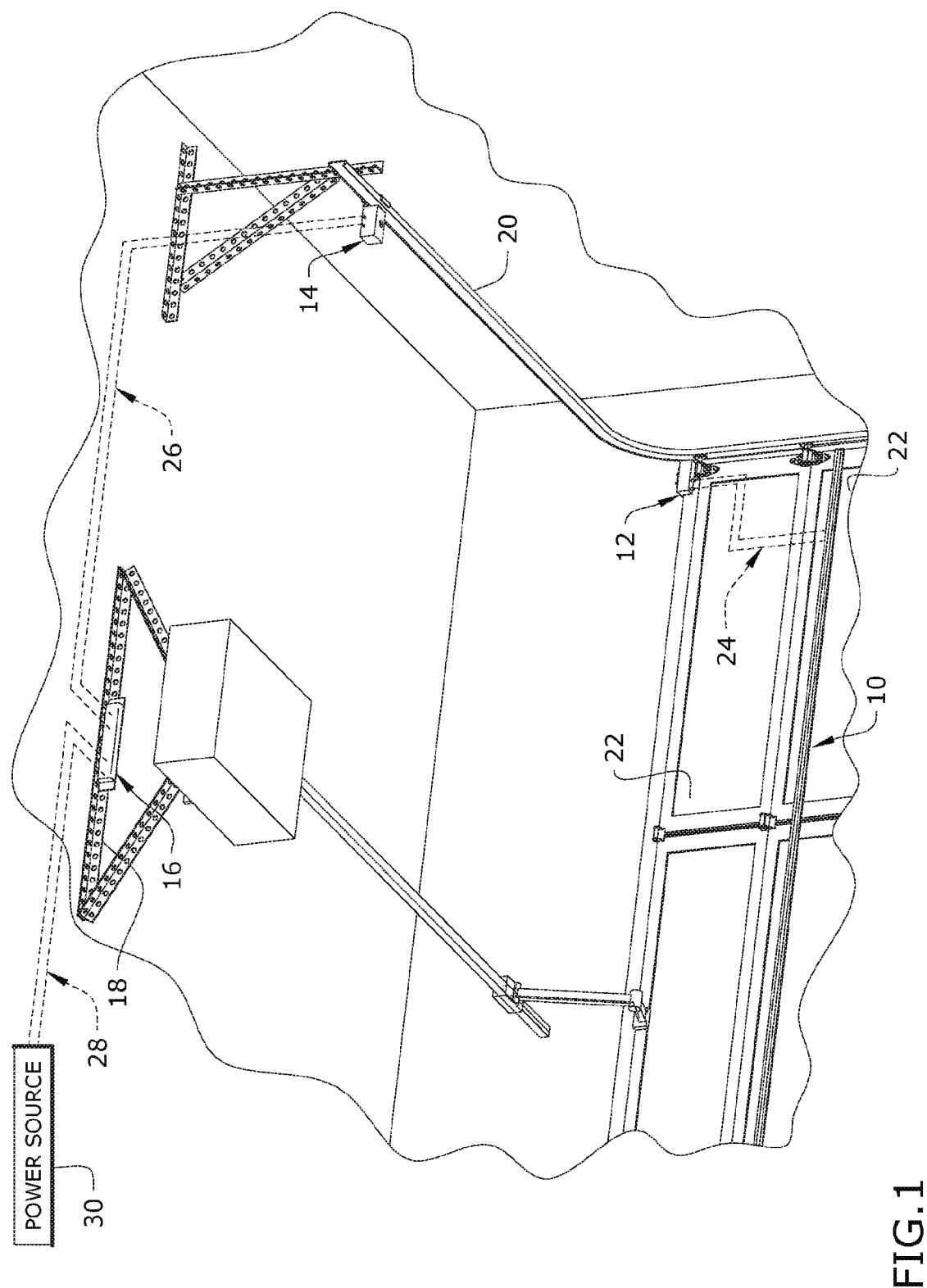
FIG. 1 shows a lower perspective detail view of one embodiment of the present invention shown in use in non-contact configuration.
Figure 2:
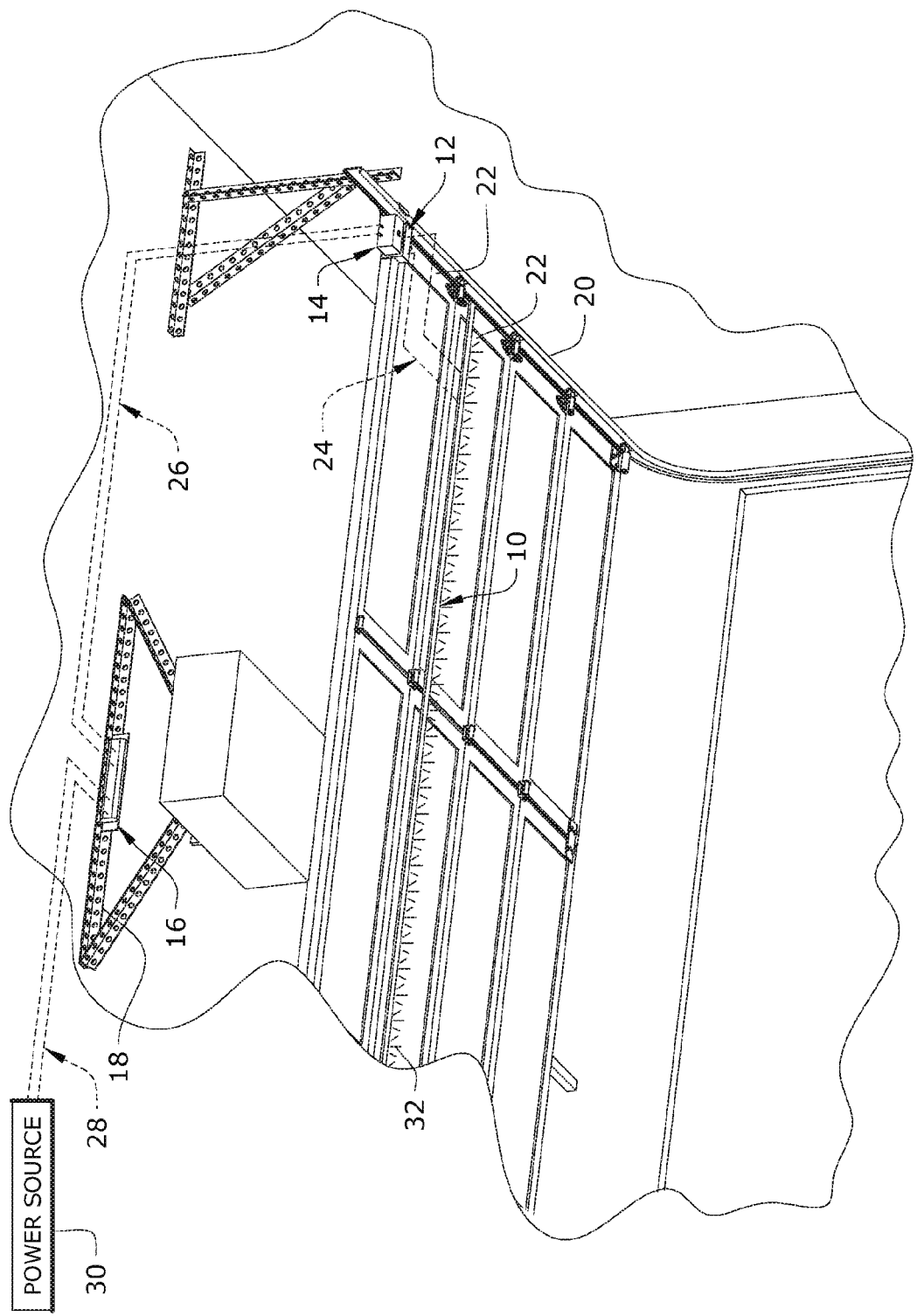
FIG. 2 shows a lower perspective detail view of one embodiment of the present invention shown in use in contact configuration.
Figure 3:
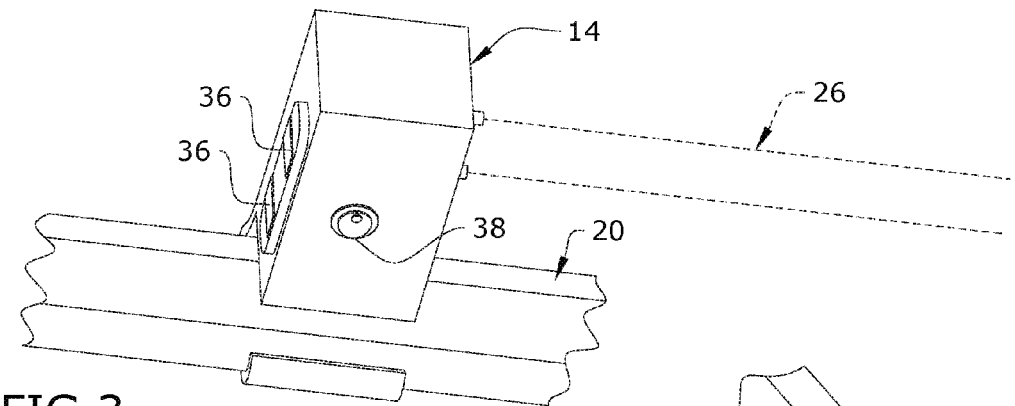
FIG. 3 shows a lower perspective view of the invention component (item 14 garage tail contact switch) of the present invention.
Figure 4:
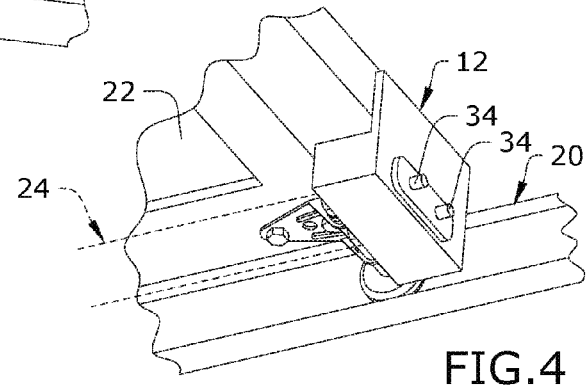
FIG. 4 shows a lower perspective view of the invention component (item 12 garage door contact switch) of the present invention.
Figure 5:
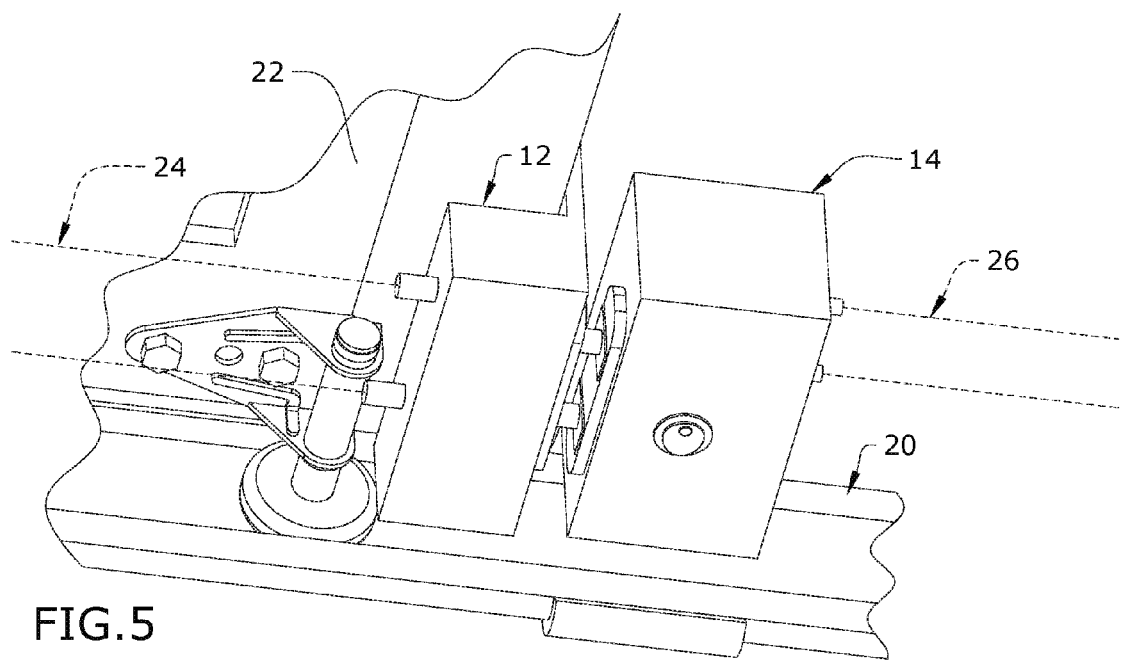
FIG. 5 shows a lower perspective view of the invention components (item 12 and item 14) of the present invention shown in contact configuration.
Figure 6:
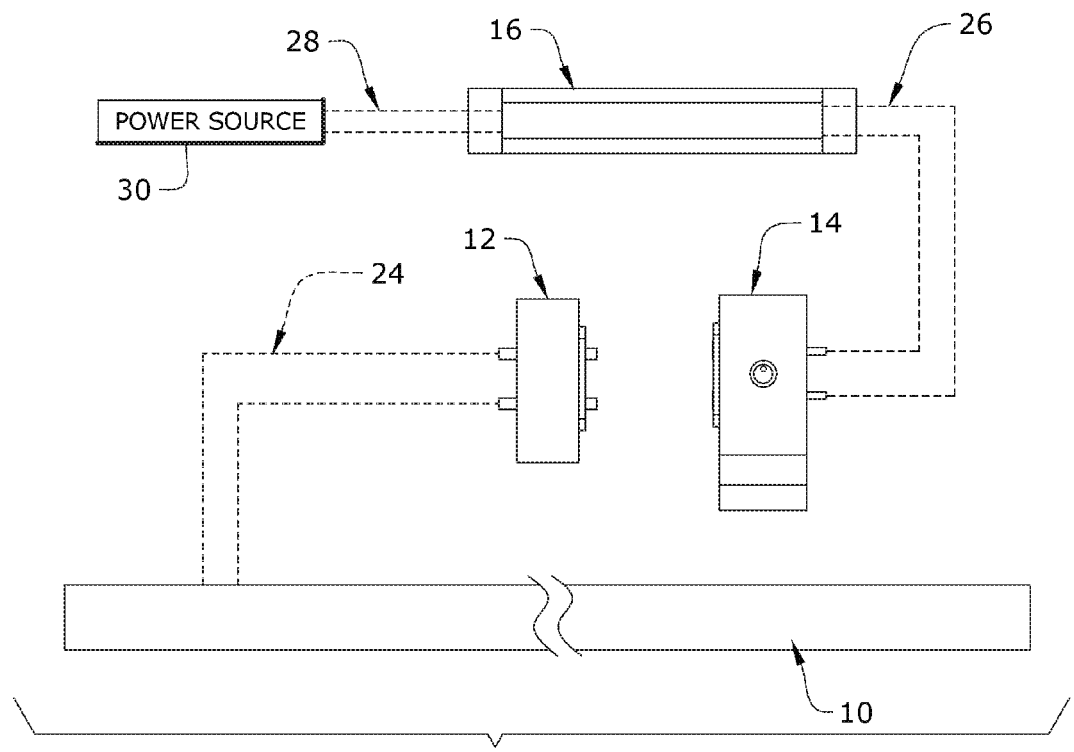
FIG. 6 shows a schematic view of one embodiment of the present invention.
Figures 7, 8:
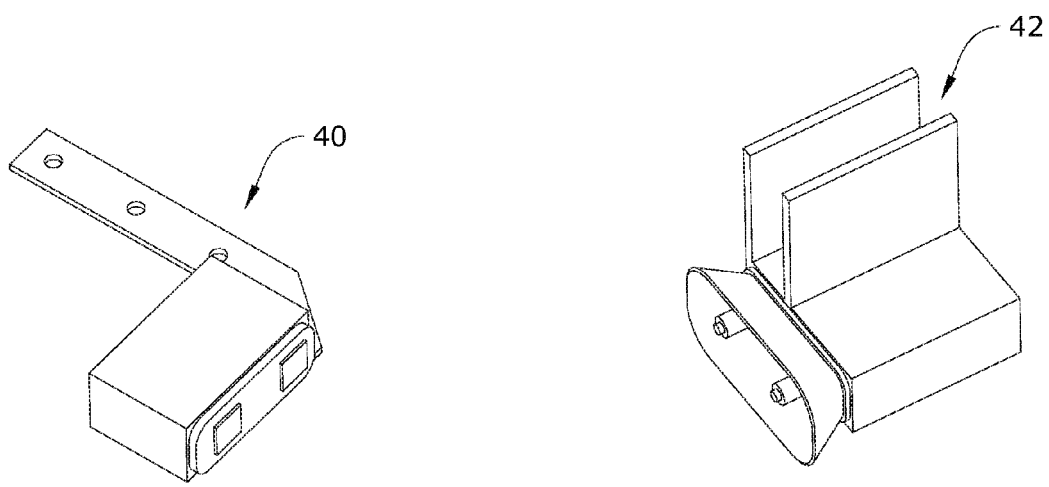
FIG. 7 shows a perspective view of an alternate embodiment of an invention component.
FIG. 8 shows a perspective view of an alternate embodiment of an invention component.

By way of example, and referring to FIGS. 1-8, one embodiment of the present system comprises a kit 10 for illuminating a room with a light strip 24 mounted on an interior surface of door when the door is completely opened. The kit 10 comprises a two-part contact switch, door contact switch 12 mounted on one of the edges of the interior surface of the door and a door rail contact switch 14 mounted on a door track railing where the corresponding top edge rests when the door is completely opened. The door contact switch 12 and the door rail contact switch 14 are electrically connected to the light strip and to a power source 30 via a voltage reduction device 16, respectively. When the door opens upon slidably tracking the door along the railing, both the switches of the two-part switch are coupled to complete the circuit, in turn, illuminating the light strip. The room thus illuminated can be useful for performing many tasks, such as working on an automobile.

Now turning to detail, the sectional door comprises a plurality of hingedly connected door panels 22 that slidably track the door along the door track railings on both top edges, a right edge and a left edge, of the door for opening and closing the door. When the door is opened, the door blocks any existing light source above the door when in an opened position and limits visibility when using the room for performing tasks. The kit 10 disclosed here solves this problem by illuminating the room when the door is opened. The kit 10 comprises the light strip 32 that is shock-resistant and is horizontally attached to the interior surface of the door on the door panel. The kit 10 also comprises the two-part contact switch having the door contact switch 12 mounted on either the right or the left edge of the interior surface of the door and the door rail contact switch 14 mounted on the door track railing 20 where the corresponding top edge rests when the door is completely opened. The door rail contact switch 14 is further electrically connected to a power adapter 16 using an electrical wiring between the power adapter 16 and the door rail contact switch 26. In some embodiments, the power adapter 16 can be mounted on a support railing 18 that securely attaches a door opener motor to the ceiling. In some embodiments, the power adapter 16 is powered by a power source 30 via an electrical wiring between the power source 30 and the power adapter 28 and is configured to transform 110 V alternating current to a direct current between 12 and 24 V, preferably 12 V. In other embodiments, different current and voltage settings can be used. Furthermore, the door contact switch 12 is electrically connected to the light strip 24 via an electrical wiring between the door contact switch 12 and the light strip 24.

The door contact switch 12 is fastened to the edge of the interior surface of the door while the door rail contact switch 14 is mounted on the railing by a hook such that arc of the hook holds the railing and opposite end is fastened to said switch. The door rail contact switch 14 further comprises a contact plate 36 for receiving a plurality of electrical spring-loaded contacts 34 protruding out from the door contact switch 12. When the door is completely opened, the contact plate 36 receives the contacts and completes the circuit to power the light strip, illuminating the room. If the light is not required, the door rail contact switch 14 also has a manual switch 38 on bottom of the switch to turn the light off and also to turn the light on if required at later time. The door contact switch 12 can be mounted in alternate way 40. Likewise, the door rail contact switch 14 can also be mounted in alternate way 40 using a slot instead of the hook.

The components of the kit 10 can be replaced with a functionally similar component. For example, the light strip can be replaced with other low voltage light technology. The power adapter 16 can be replaced with other means for reducing the voltage. Further, the kit 10 can be modified to equip the door with different operating systems, such as retractable, canopy. In some embodiments, a hose clamp device that goes between the switch and the bracket and wraps around the overhead door track rail to secure the stationary portion of the switch. In some embodiments, communicative components can be either remote or wired.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. §112, ¶6. In particular, any use of "step of" in the claims is not intended to invoke the provision of 35 U.S.C. §112, ¶16.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A kit for illuminating a room when door is completely opened, the kit comprising:
    a two-part contact switch comprising:
        door contact switch having a plurality of spring-loaded contacts, mounted on an interior surface of the door; and
        a door rail contact switch having a contact plate that faces the door and a manual switch facing a ground surface, mounted on a door track railing where a corresponding top edge rests when the door is completely opened;
    a light strip electrically connected to the door contact switch and horizontally mounted on the interior surface of the door; and
    a power adapter electrically connected to the door rail contact switch on one end and to a power source on other end and mounted on a support;
    wherein when the door is completely opened, the contact plate of the door rail contact switch receives the spring-loaded contacts protruding from the door contact switch that completes a circuit, powers the light strip, in turn, illuminating the room.

2. The kit for illuminating the room of claim 1, wherein the door rail contact switch is mounted on the railing by a hook such that an arc of the hook holds the railing and opposite end is fastened to the door rail contact switch.

3. The kit for illuminating a room space of claim 1, wherein the door contact switch is fastened to the edge of the interior surface of the door.

4. A control system, configured to provide a light to a room; the control system comprising:
    a door arranged on a door rail within the room;
    a door contact switch connected to the door;
    a door rail contact switch connected to the door rail;
    an electrical control, connected to the door contact switch and the door rail switch and programmed with instructions to perform the following:
        determine whether the door contact switch is proximate the door rail switch;
        complete a circuit between a light strip and a power source;
        provide the light to the room.

* * * * *